Lloyd O. Goodwin
INVENTOR.

BY Newell Potter
ATTORNEY

March 11, 1952  L. O. GOODWIN  2,588,717
APPARATUS FOR MEASURING DIPS OF WELL STRATA
Filed May 25, 1946  3 Sheets-Sheet 3

Lloyd O. Goodwin
INVENTOR.

BY Newell Pottoff
ATTORNEY

Patented Mar. 11, 1952

2,588,717

UNITED STATES PATENT OFFICE 2,588,717

APPARATUS FOR MEASURING DIPS OF WELL STRATA

Lloyd O. Goodwin, Tulsa, Okla., assignor to Stanolind Oil and Gas Company, Tulsa, Okla., a corporation of Delaware Application May 25, 1946, Serial No. 672,209

5 Claims. (Cl. 73—152)

This invention relates to the logging of wells and is directed particularly to the measurement in a single well of the dip and strike of strata penetrated by it. Specifically, the invention is directed to apparatus for improving the accuracy of dip measurements by taking into account certain of the variables which either are not considered or are not evaluated with sufficient accuracy in present methods of dip measurement.

Although a number of devices and methods have been proposed for measuring the dip of strata in a well, the so-called "spontaneous potential dipmeter" appears to be the only one which has been developed and applied to any great extent. That device employs three electrodes equally spaced around the wall of a well to make three logs of the changes in natural or spontaneous potential encountered in passing across an interface from one stratum to another of different chemical composition or porosity. The differences in depth at which these changes affect the various electrodes are carefully measured and used to calculate the dip and strike of the interfaces.

For very large angles of dip such as those encountered around salt domes the degree of precision to which the dips are measured by the spontaneous-potential method is considered satisfactory. But when the dip angles are less than 10°, as is true of very many structures and formations in which highly valuable deposits of oil, gas, and other minerals are found, the indications given by this method are much less positive. It has been clearly shown over a period of several years of commercial use that, where the strata are nearly horizontal, the indications of dip given by this dip-measuring instrument are at best only qualitative and not quantitative.

In the measurement of dips by this method at least two assumptions apparently are made, which can contribute largely to the inaccuracy of the determinations. It is assumed, first, that the diameter of the hole is known either from the size of the bit used or from independent measurements made with a caliper instrument; and, second, that the longitudinal movement of the dipmeter instrument in the hole is exactly equal to the movement of the upper end of the suspending cable.

The magnitude of the possible errors arising from these assumptions in the event they are unjustified will be appreciated when it is realized that the percentage error in dip is roughly equal to the percentage error in the diameter.

For example, calculation shows that for dips of around 5° underestimating the actual diameter by 20 per cent introduces an error of nearly 25 per cent. Overestimating by 20 per cent is only slightly less serious, the error being around 16 per cent to 17 per cent.

Similarly, for holes of the usual diameter, the percentage error in determining the difference in depth of an interface on opposite sides of a hole introduces approximately an equal percentage of error in the calculated dip. For example, in a 10-inch hole an error in measuring depth differences of, say, 0.2 inch where the difference in depth of an interface is 1 inch, i. e., a 20 per cent reading error, produces a dip error of very nearly 20 per cent. Of course, for holes of larger diameter and for larger dips a 0.2-inch error in depth would be less serious, but it is nevertheless a quantity always to be reckoned with and eliminated if possible.

Considering the hole diameter, it has been amply demonstrated by numerous logs to vary often and widely from the size of the bit. Soft formations may be eroded by the drilling fluid and abraded by the drill pipe until the hole diameter is several times the bit diameter. Hard formations usually remain about the same as cut by the bit; but, if they are unusually porous and the drilling fluid is of doubtful plastering ability, a mud filter cake may form on them thick enough to reduce the diameter to a point where the pipe becomes stuck, or, at the very least, difficulties are encountered in withdrawing or inserting the bit and drill collars. Furthermore, the changes in hole diameter may be very great and quite abrupt—so much so that hole-diameter logs may often be correlated from one hole to another by marker beds which are notably harder or softer than the adjoining strata.

It is because of the abruptness and frequency of these diameter changes that caliper measurements of them are only of limited utility for taking them into account for dip calculations. Because of the differing stretch of drill pipe, tubing, measuring lines, and logging cables, depth determinations, particularly in deep wells, are subject to serious discrepancies amounting on occasions to several feet. As the diameter of the well may change by several hundred per cent within a depth interval of one foot or less, it is clear that either the assumption of a diameter or an independent determination of it by caliper logging is in many cases a source of error.

As for the determination of depths and depth differences, if it is desired to know the depth of the instrument only to within several inches or a foot or so, the assumption that the instrument movement is the same as the movement of the upper end of the cable is probably permissible. But for very accurate calculation of dips, particularly when they are small, and the hole diameter is also small, it is important to know the position of the instrument to within 0.1 inch, or even less if possible. However, the friction of the suspending cable against the walls of the hole, the friction of the instrument-centering guides, the pressure of the measuring electrodes, and the irregularities of the walls themselves all contribute to make the instrument movement erratic and jerky despite the application of a uniform pull at the upper end of the cable.

Because of the length of the cables employed it is essential to consider their elasticity in relation to the unavoidable frictional forces present and the fact that the instrument is moved rather slowly. Thus, static friction tends to hold the instrument fixed until the cable elongates and its tension increases enough to break the instrument loose. Then follows an upward movement against the lesser retarding force of sliding friction until the tension is reduced, whereupon the upward movement stops and the instrument is again held by static friction. This effect of alternately starting and stopping, thus moving by jerks, is accentuated by the very slow logging speed ordinarily employed to permit ample time for accurate recording; and it is only made worse by further slowing down the movement of the upper end of the suspending cable in attempts to increase accuracy. Considering all these sources of friction and their variability, it seems clear that the measurement of instrument position to the desired precision by measuring the cable movement is the exception rather than the rule.

It is, accordingly, a primary object of my invention to provide for logging the dip of well strata apparatus which is accurate for both large and small angles of dip. Another object is to provide a method and apparatus of this type for accurately evaluating variables contributing to the uncertainty of dip determinations. A further object is to provide a dip-logging method and apparatus by which variations in the diameter of the well bore are accurately measured for the purpose of taking them into account in the calculation of dip. Another and more specific object is to provide a dip-logging method and apparatus capable of taking advantage of the erosion of soft formations to a hole of large diameter, the interfaces between formations in such holes being detected with the same accuracy as they are for smaller diameter holes. Still a further object is to provide a dip-logging method and apparatus in which the longitudinal movement of the instrument itself along the well is accurately indicated, independently of the movement of the suspending cable. Other and further objects, uses, and advantages of the invention will become apparent as the description proceeds.

These objects are accomplished according to my invention by a dipmeter instrument having on radially movable arms a plurality of, preferably at least three, formation-character measuring devices pressed against the well walls at all times. The well diameter is indicated simultaneously by recording the position of these same movable arms while the formation character is being recorded. The movement of the instrument along the well is indicated by establishing a reference point near the part of the well to be surveyed and measuring the instrument displacement from that point rather than by measuring the movement of the suspending cable at the top of the well.

The principles and operation of my invention will be more easily understood by reference to the accompanying drawings illustrating certain embodiments of the invention, and forming a part of this application. In these drawings, in which the same reference numeral in different figures indicates the same or a corresponding part:

Figure 6 is a cross section of a preferred type of character-measuring device.

Figure 1:
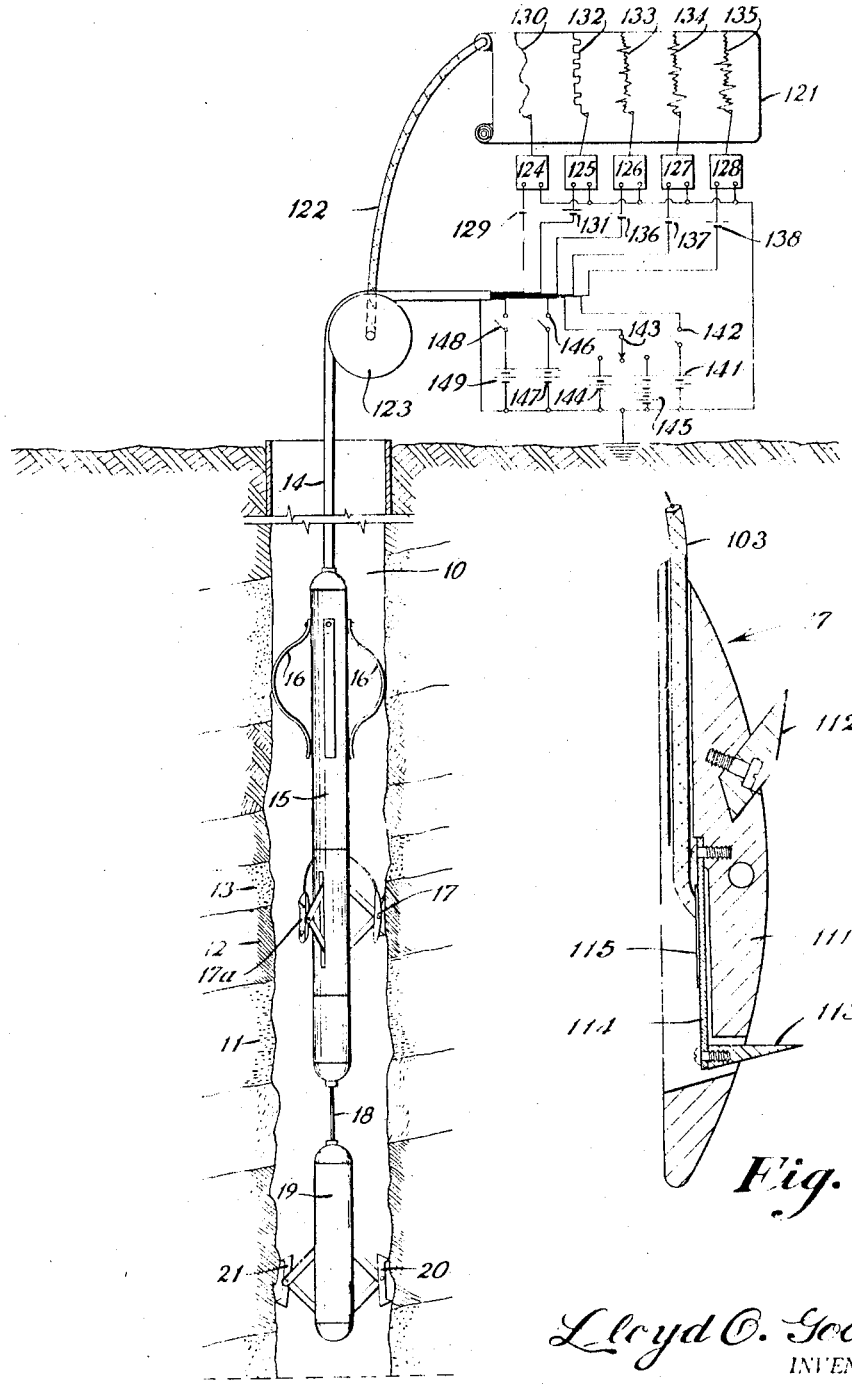
Figure 1 is a cross section of a well showing in elevation an embodiment of the invention suspended therein, together with surface recording and controlling equipment.

Referring now to Figure 1, intersected by a well 10 are a plurality of strata, such as strata 11, 12, and 13, of which the directions and angles are to be determined. Supported from the earth's surface by a cable 14, which preferably contains a number of insulated conductors, is a dipmeter instrument 15 held in the center of well 10 by flexible centralizers 16. Projecting from instrument 15 and held by extendable arms against the wall of well 10 are a plurality of formation-character detectors 17, 17a, etc., spaced equally around instrument 15. These are preferably at least three in number spaced 120° apart around the wall well 10. Connected by a wire 18 to dipmeter instrument 15 is an anchor device 19 having on extendable arms shoes 20 and 21 with sharp cleats for digging into the wall of well 10 and holding firmly fixed anchor 19 and the lower end of wire 18.

Figure 2:
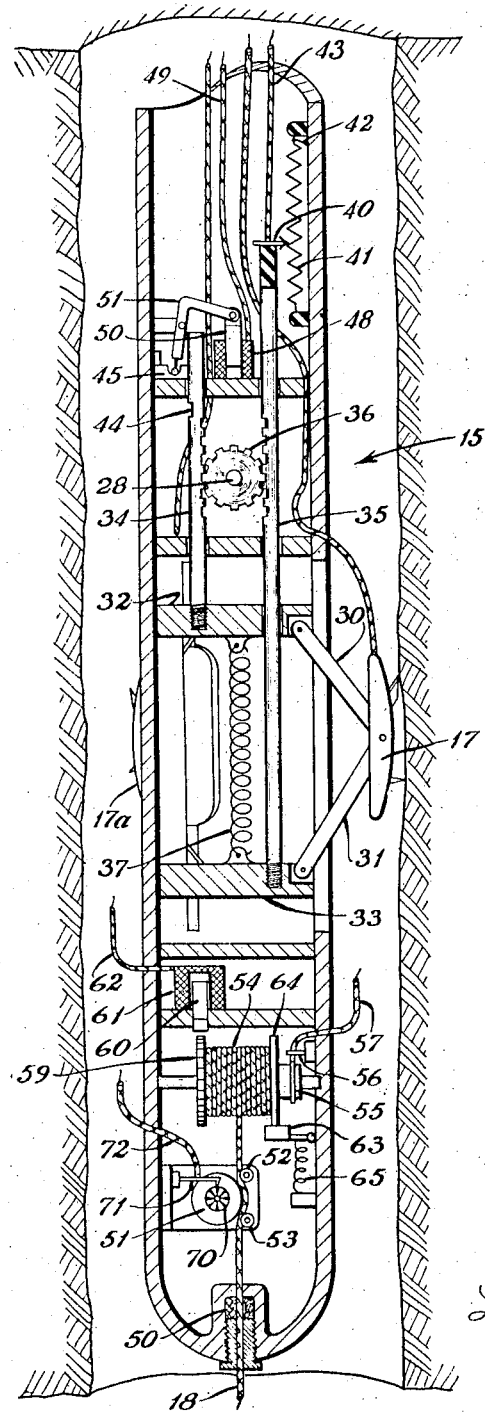
Figure 2 is a cross section of the lower end of a dipmeter device embodying the invention.

The dipmeter instrument 15 is shown in more detail in Figure 2, where it will be seen that the detector 17, for example, is carried at the pivot point of the pair of arms 30 and 31, the other ends of which are attached to crossheads 32 and 33 within the body of instrument 15. Racks 34 and 35, engaged by the gear 36 rotatable about shaft 28 which is fixed to the case of instrument 15, are attached to and so control the vertical movement of crossheads 32 and 33 that they move together or apart in unison, producing a movement of detector 17 perpendicular with respect to instrument 15. A tension spring 37 pulls crossheads 32 and 33 together, thus urging detectors 17, 17a, etc., outwardly into contact with the wall of well 10. Preferably the constants of spring 37 are so chosen or adjusted as to maintain the pressure of detector 17 against the wall of well 10 fairly uniform over most of the well diameters for which the instrument is designed to work. This can be done to a sufficient approximation by so choosing spring 37 that the increase in lateral thrust applied to detector 17 as the crossheads move together tends to be compensated by the decrease in spring tension.

An important feature of this instrument is the fact that the detectors move perpendicularly with respect to the instrument axis. If this were not so, there would be a vertical component to their movement in following irregularities in the well walls which would make the exact depth of the detectors depend on the well diameter. It should also be noted that by using sufficiently long arms 30 and 31 a very great range of well diameters can be logged. Thus, if a soft formation is considerably eroded so that the hole diameter is large, the detectors are still able to maintain contact with the hole wall and thus can locate interfaces as accurately as for normal diameters.

As the detectors 17, 17a, etc., spaced at the same level around well 10 move perpendicularly to and from the body of instrument 15 in response to variations in the well diameter, this movement is indicated by changes in an electrical circuit. One of a number of means for accomplishing this is to mount an insulated contactor 40 on the end of one of the racks such as rack 35, to which the radial movement of the detectors is imparted, which contactor engages an elongated resistance wire 41, one end of which may be grounded, as by the lead 42. By applying a voltage to contactor 40 through the insulated lead 43 extending to an indicator, the position of rack 35, and hence the diameter of the well, can be determined by the portion of resistance 41 included in the circuit.

As the equipment is ordinarily run into a well with the arms retracted but releasable at the will of the operator, a notch 44 cut in the rack bar 34 is adapted to be engaged by a key 45. For releasing the mechanism when the desired depth has been reached, a solenoid coil 48 energized by electric current supplied from the surface through an insulated lead 49 pulls downward a plunger 50 actuating a lever 51 and withdrawing key 45 from notch 44.

Also within the upper portion of instrument 15 are means (not shown) for determining the inclination of the well bore and the directional orientation of the detectors 17. Any of a number of commercially available devices are suitable for this use, it being preferable that the making of a direction and inclination record be controllable from the surface, as by supplying a control current over an insulated conductor to initiate or actuate the recording mechanism. One such device is shown and its use in logging to determine the dip of well formations is described in detail in U. S. Patent 2,427,950 to H. G. Doll.

The lower end of instrument 15 is devoted to means for indicating its vertical movement in a well being logged. For this purpose the wire 18 is brought into the bottom compartment of instrument 15 through a packing gland 50, passes over a measuring wheel 51, with which it may be held in contact by suitable rollers 52 and 53, and is wound on reel 54. The insulated conductor, of which there is at least one in wire 18, is brought out to a slip ring 55 contacted by an insulated brush 56 connected to an insulated lead 57 extending to the earth's surface. There is thus provided a continuous insulated electrical circuit extending from the surface to the anchor 19 by which electric current may be transmitted for setting and releasing it at will.

To prevent unreeling of wire 18 from reel 54 when it is not desired, flange 59 forming one end of reel 54 may have notches or gear teeth adapted to be engaged and held stationary by the tip of the ferromagnetic core 60 of the solenoid 61. By application of current to solenoid 61 over the insulated lead 62 connecting it to the surface, the tip of core 60 may be withdrawn from and held out of contact with flange 59 so that the reel 54 can turn. Wire 18 is maintained taut at all times by suitable friction-brake means, such as the brake 63 which is pressed against the reel flange 64 by a spring 65.

It will be seen that with anchor 19 fixed in place in the well thus fixing one end of wire 18, and with core tip 60 disengaged from flange 59, the pulling of instrument 15 upward through the well will unreel wire 18 from reel 54 and produce a rotation of measuring wheel 51 exactly corresponding to this upward movement. Any irregularity of the instrument movement will cause a corresponding variation in the rotation of wheel 51, so that from wheel 51 may be derived exact information of the location and motion of instrument 15 at any moment. An electrical indication of this rotation of measuring wheel 51 may be transmitted to the surface or recorded in a number of ways. One means, preferred for its simplicity, is to provide wheel 51 with a commutator 70 consisting of a number of segments alternately of insulating and conducting material. A brush 71, in contact with commutator 70 and connected by an insulated lead 72 extending to the surface, produces an "on-off" signal when suitably supplied with voltage. There is thus provided, simultaneously with the making of the three formation-character logs and the diameter measurement, a direct indication of the progress of the instrument through the well entirely independent of the motion of cable 14.

Figures 3, 4:
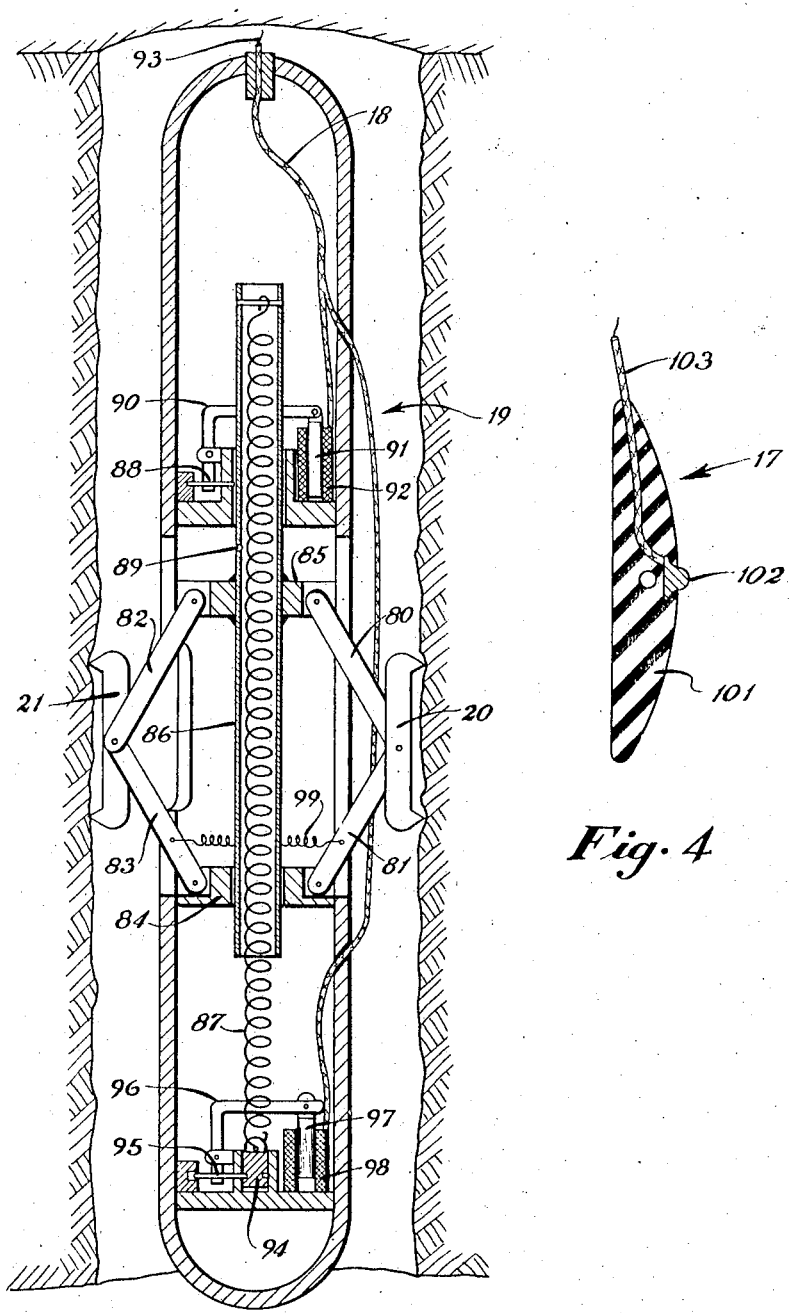
Figure 3 is a cross section of an anchor device for establishing a reference position in a well.
Figure 4 is a cross section of a formation-character-measuring electrode.

An embodiment of the controllable anchor 19 is shown in more detail in Figure 3. Similarly to the mounting of detector 17 the cleated shoes 20 and 21 are mounted at the pivot points of the pairs of arms 80, 81 and 82, 83, respectively. The other ends of arms 81 and 83 are pivoted to the fixed cross piece 84 within the tubular body of anchor 19, while the corresponding ends of arms 80 and 82 are attached to the crosshead 85 which is fixed to the tubular member 86, movable longitudinally within device 19. A tension spring 87 pulling downwardly on member 86 and crosshead 85 urges arms 20 and 21 outwardly into firm contact with the well walls when anchor 19 is to be set.

Anchor 19 is run into a well with the arms retracted but releasable, and for the latter purpose a pin 88 engages a notch 89 in tube 86 when the tube is in its uppermost position. Pin 88 is withdrawn from notch 89 by a lever 90 actuated by the plunger 91 of a solenoid 92 when voltage is applied thereto by the operator over the wire 18, which has an insulated conductor 93.

For retracting the shoes 20 and 21 at the end of a survey, the lower end of tension spring 87 is attached to a notched plug 94 held in its socket at the bottom end of anchor 19 by a pin 95 which, like pin 88, is withdrawn from holding plug 94 by a lever 96 actuated by the core 97 of a solenoid 98. Upon thus releasing the tension of spring 87, a smaller spring 99 attached to the arms 81 and 83 is able to retract shoes 20 and 21. Current to energize solenoid 98 may also be supplied over the conductor 93 of wire 18, the two solenoids 92 and 98 preferably being responsive respectively to a low and a higher voltage. Application of a low voltage to wire 18 then operates only solenoid 92 while the higher voltage operates both. This gives a proper sequence of operation for the purposes of this invention.

The detector 17 shown in Figures 1 and 2 for locating interfaces between strata may be almost any device capable of responding to some property of the formations by which they can be sharply resolved. Only the particular stratum immediately adjacent the detector should produce a response. Thus, as shown by Figure 4, the detector 17 may be a shoe of insulating material 101 in which is set a metallic electrode 102 connected by the insulated lead 103 to a suitable recorder at the surface. This will detect the spontaneous potentials encountered along the wall of the well, which generally change abruptly at the interfaces between strata.

Figure 5:
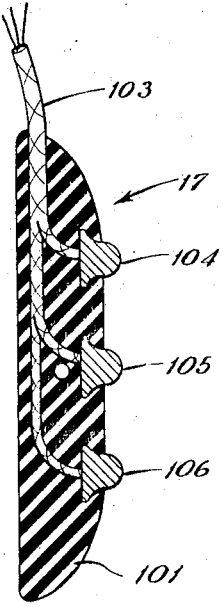
Figure 5 is a cross section of an alternative character-measuring device.

Another device capable of very accurately locating interfaces between strata is shown in Figure 5. Set or moulded in the shoe 101 of insulating material are three small metal electrodes 104, 105, 106, each of which is connected by a separate insulated lead in the cable 14 to the earth's surface. When current is passed between the center electrode 105 and a distant point such as a grounded electrode at the earth's surface, the potential difference between electrodes 104 and 106 remains at zero except when the electrode configuration crosses an interface between two strata. The potential difference then varies sharply, as disclosed in U. S. Patent 2,206,892, so that the interface can be very accurately located. As it is the difference in electrical resistivity of two strata rather than porosity or chemical composition which produces the response, the interfaces located by this detector are often different from those picked up by the spontaneous-potential method.

This electrode configuration is particularly adaptable to locating formation interfaces in wells which have been drilled using an oil-base drilling fluid. By sharpening the three electrodes 104, 105, and 106 so that they cut a narrow groove through the non-conducting filter cake and make direct electrical contact with the formations, reliable indications can be obtained provided there has not been too much intrusion of the oil or other non-conducting fluid into the various strata.

Because of the wide and very abrupt variations in grain structure and hardness of well formations, a log related to such properties is particularly advantageous for locating strata interfaces. The preferred means for use in my invention is therefore a device responsive to such properties. As shown in Figure 6, this comprises a pointed stylus 113 in contact with only a very minute area of the formation at any one time, so that in passing or scraping over different formations the stylus is caused to vibrate in different ways characterizing the respective strata. Thus, on the shoe 111 are mounted a pointed scraping blade 112, preferably replaceable, for cutting a groove in the filter cake normally forming the wall of the well, and the pointed stylus 113 which follows along this groove. Being mounted on the free end of a leaf spring 114, of which the other end is fixed to the shoe 111, stylus 113 in scraping along the bottom of the groove is free to vibrate relatively to the shoe 111 which slides smoothly over the surface of the filter cake and to the scraper 112 which contacts an appreciable area of the bottom of the groove. By suitable means such as an electrical strain gauge 115 cemented to spring 114, its resultant flexing with these vibrations is translated into electrical current variations which can be transmitted over the insulated conductor 103 in cable 14 for recording at the surface of the ground.

Referring again to Figure 1, the surface recording and controlling equipment is seen to include the chart 121 which is moved in accordance with the approximate depth of instrument 15 in the well by an appropriate driving connection 122 from the sheave 123 over which cable 14 passes. On chart 121 five traces are recorded by the recorders 124, 125, 126, 127, and 128. The circuit of recorder 124, which includes the battery 129 in series with the lead 43 and contactor 40 of Figure 2, carries an electric current varying with the well diameter, which is therefore indicated by the trace 130. The battery 131 may be included in the circuit of commutator 70 and recorder 125, so that the "on-off" signal indicating directly the movement of the instrument 15 along the well appears on the trace 132. Each of the other three traces 133, 134, 135 is the record of the current of one of the batteries 136, 137, 138 as it is modified by one of the formation-character-responsive detectors 17, 17a, etc. Of course, if the spontaneous potential is being recorded, the batteries 136, 137, and 138 are omitted and the recorders 126, 127, and 128 are actuated according to the magnitude of the potential at the respective pickup electrodes.

Several circuits are employed for controlling the subsurface operations. Thus, the lead 49 may be connected to the battery 141 and switch 142, the return circuit being completed through the metallic sheath of cable 14 and the ground. When switch 142 is closed, voltage is applied to solenoid 48 for releasing the arms carrying detectors 17 out into contact with the walls of the well.

For controlling the operation of anchor 19, the lead 57 is brought out to the switch 143 which, when thrown to the left, applies the potential of the battery 144 to solenoids 92 and 98 and when thrown to the right applies to these coils the larger potential of battery 145. Battery 144 supplies sufficient voltage to operate solenoid 92 for setting shoes 20 and 21, but the larger voltage of battery 145 is needed for also operating solenoid 98 to bring about retraction of these shoes.

Actuation of solenoid 61 to unlock reel 54 for rotation is accomplished by connecting lead 62 to the switch 146 and battery 147 so that closing this switch applies voltage to the solenoid 61 as desired. In a similar way the inclination and orientation measuring equipment is actuated over a separate circuit including the switch 148 and potential source 149, switch 148 being closed momentarily whenever it is desired to make a record of the instrument orientation and the well inclination.

The operation of my invention, which is believed apparent from the foregoing description, may be summarized as follows: After lowering of the entire assembly to the bottom of the section of the well to be logged, momentarily throwing switch 143 to the left extends shoes 20 and 21 out against the wall of the well.

Then preferably the calipering and detector carrying arms are released by momentarily closing switch 142. Thereafter a record of the inclination of the well and the orientation of the instrument should be made by momentarily closing switch 148. Finally, when the logging is to be started, switch 146 is closed, lifting plunger 60 out of engagement with flange 59, and the instrument 15 may then be moved slowly upward, paying out wire 18 in accordance with its movement. At the top of the section logged and as often as desired at intermediate positions, the movement may be halted and switch 148 actuated to make records of the instrument orientation and well inclination.

When the logging of a section of well is completed, switch 143 is thrown to the right to supply voltage for actuating plunger 97 of solenoid 98 to release the tension of spring 87. Spring 99 then retracts shoes 20 and 21. Thereafter, switch 146 may be opened, allowing plunger 60 to lock reel 54 against further rotation, and the entire instrument and anchor assembly may be removed from the well. For best results it is usually necessary to replace scraper blade 112 and stylus 113 after each logging run. It is therefore no particular disadvantage to let the detectors 17 slide along the well wall in extended position during raising of the instrument to the surface of the ground.

Having thus described my invention in terms of the foregoing specific embodiments, numerous modifications thereof will undoubtedly occur to those skilled in this art. The scope of my invention should, therefore, not be considered as limited to the exact details of the method and apparatus described but is to be defined by the scope of the following claims.

I claim:

1. Apparatus for logging wells comprising in combination a logging instrument adapted to be lowered into a well, a flexible support for said instrument, said support being slightly extensible with increasing tension due to the inherent elasticity of the materials forming it, a second flexible and extensible support depending from said instrument, an anchor fixed to the lower end of said second support, means for paying out said second flexible support, permitting relative movement between said anchor and said instrument, and means actuated by the paying out of said second support for indicating at the surface the distance said instrument is lifted above said anchor.

2. Apparatus for logging wells comprising in combination a vertically elongated instrument adapted for passage through a well, a first cable fixed to the upper end of said instrument, a second cable depending from the lower portion of said instrument, an anchor fixed to the lower end of said second cable and comprising radially extendable and retractable wall-engaging means, means for paying out said second cable as said instrument is moved by said first cable away from said anchor, and means actuated by the movement of said second cable therethrough for indicating at the surface the length of said second cable between said instrument and said anchor during movement of said instrument through the well.

3. In an apparatus for logging wells and adapted to be lowered into a well on a cable which is slightly extensible with increasing tension due to the inherent elasticity of the materials forming it, the combination which comprises a member adapted to carry a logging means, an anchor spaced from said member, wall-engaging means on said anchor adapted to hold it fixed in a well bore, a flexible wire extending between said member and said anchor, means for paying out said wire as said member is moved by said cable away from said anchor, means actuated by the paying out of said wire for indicating at the surface, during the moving of said cable and simultaneously with the indication of said logging means, the movement of said member relative to said anchor.

4. Apparatus for logging wells comprising an instrument adapted to be passed through a well, a plurality of arms pivoted to said instrument and extendable radially in a plane perpendicular to the instrument axis, a detector responsive to a property characterizing the formations of said well carried at the outer extremity of each of said arms in contact with the wall of said well, an anchor spaced from said instrument, wall-engaging means on said anchor adapted to hold it fixed in a well bore, a flexible wire connecting said instrument and said anchor and adapted to be payed out upon movement of said instrument away from said anchor, means actuated by the movement of said wire therethrough proportional to the movement of said instrument away from said anchor, and means for indicating simultaneously the responses of each said detector, the extension of said arms, and the response of said movement-actuated means.

5. Apparatus for logging wells comprising an instrument adapted to be passed through a well, a plurality of arms pivoted to said instrument extendable outwardly toward the wall of said well, a detector responsive to a property characterizing the formations of said well carried at the outer extremity of each of said arms, an anchor spaced below said instrument, wall-engaging means on said anchor adapted to hold it fixed in a well bore, a flexible wire connecting said instrument and said anchor, means adapted to pay out said wire upon movement of said instrument away from said anchor, electrical circuit means including said wire adapted to actuate said wall-engaging means, means actuated by the movement of said wire therethrough proportional to the movement of said instrument away from said anchor, and means for indicating at the surface simultaneously the response of each said detector, the extension of said arms, and the response of said movement-actuated means upon moving said instrument through said well away from said anchor.

LLOYD O. GOODWIN.

REFERENCES CITED

The following references are of record in the file of this patent:

UNITED STATES PATENTS

| Number | Name | Date |
| --- | --- | --- |
| 1,339,955 | Hardel | May 11, 1920 |
| 2,150,070 | Kregecz | Mar. 7, 1939 |
| 2,313,176 | Shelby | Mar. 9, 1943 |
| 2,340,987 | Robidoux | Feb. 8, 1944 |
| 2,398,562 | Russell | Apr. 16, 1946 |
| 2,408,012 | Williams | Sept. 24, 1946 |
| 2,483,770 | Hildebrandt | Oct. 4, 1949 |